Nov. 14, 1944.    G. E. REED    2,362,664
CLOSE-FIT CONNECTOR
Filed March 20, 1943

INVENTOR.
George E. Reed
BY
ATTORNEY.

Patented Nov. 14, 1944

2,362,664

UNITED STATES PATENT OFFICE 2,362,664

CLOSE-FIT CONNECTOR

George E. Reed, Omaha, Nebr., assignor to Charles C. Bradt, Kansas City, Mo.

Application March 20, 1943, Serial No. 479,857

1 Claim. (Cl. 85—1)

This invention relates to connectors and particularly to devices of that character for connecting overlapped arms or bars as for example, the arm of a distributor holder and the bar of a vacuum unit.

Many automobile engines are equipped with an octane selector whereby the timing of the distributor may be adjusted for the specific grade of fuel used in the engine. Such selectors include a distributor holding arm and a vacuum unit bar connected together in overlapped relation by a cross pin or bolt, extended therethrough. After continuous service the connection between these members becomes worn to the extent that the distributor timing is no longer accurate nor constant.

It is the important aim of this invention, therefore, to provide a connector that will automatically compensate for wear of these parts, thereby maintaining a close fitting relationship between the bar of the vacuum unit and the arm of the distributor.

A further object of the invention is the provision of a close-fit connector of simple construction that may be easily manufactured at low cost.

These and other objects of the invention are accomplished with structure illustrated in the accompanying drawing, wherein.

Figure 1:
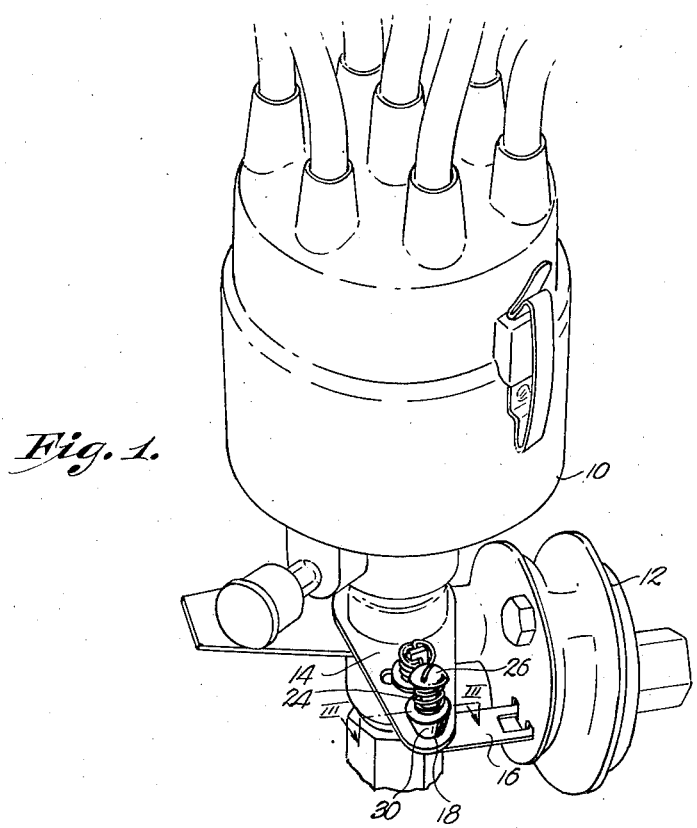
Fig. 1 is a perspective view of a distributor arm and parts of an octane selector held together by a connector constructed in accordance with this invention.
Figure 2:
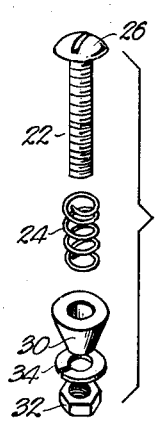
Fig. 2 is a perspective view of the parts of the connector in disassembled relation.

In the drawing, the numeral 10 designates a distributor and 12 a vacuum unit of an automobile engine. A distributor holding arm 14 has its free end in overlapped relation with a bar 16 of the unit 12 and is provided with an opening 18 aligned with a similar aperture 20 of the bar.

In common practice a bolt is extended through openings 18 and 20 and after extensive service, the bolt as well as the openings become worn and allow a limited amount of play between arm 14 and bar 16. Thereafter, accurate timing of the distributor for a particular grade of fuel, is no longer possible.

To remedy this condition, a connector or replacement bolt 22 embodying this invention, is provided. Bolt 22 is relatively long to receive a spring 24 interposed between head 26 of the bolt, and base 28 of a frustoconical collar 30 which is sleeved over the bolt. The reduced end of collar 30 is seated in openings 18 and 20 of arm 14 and bar 16 respectively, and a nut 32 is threaded onto bolt 22 to retain the parts in assembled condition and to provide for adjustment of the tension of spring 24. A lock washer 34 is inserted between bar 16 and nut 32.

Figure 3:
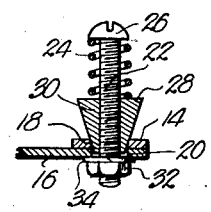
Fig. 3 is a vertical sectional view through the connector and associated parts, taken on line III—III of Fig. 1.

As clearly shown in Fig. 3 of the drawing, collar 30 is constantly urged downwardly into openings 18 and 20 by spring 24, thereby compensating for any wear that may occur on these parts.

A tightly fitting connection between arm 14 and bar 16 is thus maintained and operation of the engine is correspondingly improved.

While only one specific adaptation of the invention has been described in the foregoing, it will be obvious that a connector constructed as disclosed, can be used for many purposes, and since various modifications might be made without departing from the spirit of this invention, it is desired to be limited only by the scope of the appended claim.

Having thus described the invention, what is claimed as new and desired to be secured by Letters Patent is:

In a device of the character described for forming a pivotal connection between overlapped members having aligned openings; a headed, threaded bolt extended through said openings; a frusto-conical collar, shorter than the bolt, slidably mounted thereon with its small end projected into the said openings; a spring coiled about the bolt between the head thereof and the large end of the collar; and a nut threaded onto the bolt and disposed against one of the members for tensioning the spring, the taper of the frusto-conical collar being such as to engage the overlapped members without engaging the nut whereby the spring may progressively urge the collar into the openings as the openings are worn larger.

GEORGE E. REED.